United States Patent
Lee et al.

(10) Patent No.: US 9,136,521 B2
(45) Date of Patent: Sep. 15, 2015

(54) BUS BAR HAVING NOVEL STRUCTURE AND BATTERY MODULE INCLUDING THE SAME

(71) Applicant: LG CHEM, LTD, Seoul (KR)

(72) Inventors: Jin Kyu Lee, Daejeon (KR); JunYeob Seong, Daejeon (KR); TaeHyuck Kim, Daejeon (KR); JungMo Kim, Incheon (KR); MyungKi Park, Gyeongsan-si (KR); HyungJin Hwang, Incheon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/966,518

(22) Filed: Aug. 14, 2013

(65) Prior Publication Data

US 2013/0330595 A1    Dec. 12, 2013

Related U.S. Application Data

(63) Continuation of application No. PCT/KR2012/002714, filed on Apr. 10, 2012.

(30) Foreign Application Priority Data

Apr. 26, 2011    (KR) .................. 10-2011-0038955

(51) Int. Cl.
| | |
|---|---|
| *H01M 2/26* | (2006.01) |
| *H01M 2/10* | (2006.01) |
| *H01M 2/22* | (2006.01) |
| *H01M 2/20* | (2006.01) |
| *H01M 2/24* | (2006.01) |

(52) U.S. Cl.
CPC .............. *H01M 2/26* (2013.01); *H01M 2/1016* (2013.01); *H01M 2/202* (2013.01); *H01M 2/206* (2013.01); *H01M 2/22* (2013.01); *H01M 2/20* (2013.01); *H01M 2/24* (2013.01); *H01M 2/266* (2013.01)

(58) Field of Classification Search
CPC ......... H01M 2/20; H01M 2/202; H01M 2/22; H01M 2/24; H01M 2/26; H01M 2/266
See application file for complete search history.

(56) References Cited

U.S. PATENT DOCUMENTS

| | | | |
|---|---|---|---|
| 2002/0102457 A1 | 8/2002 | Oogami et al. | |
| 2008/0090137 A1* | 4/2008 | Buck et al. | ..................... 429/120 |

(Continued)

FOREIGN PATENT DOCUMENTS

| | | |
|---|---|---|
| CN | 101834305 A | 9/2010 |
| CN | 101395737 B | 6/2011 |

(Continued)

OTHER PUBLICATIONS

International Search Report issued in PCT/KR2012/002714, mailed on Sep. 26, 2012.

*Primary Examiner* — Jeremiah Smith
(74) *Attorney, Agent, or Firm* — Birch, Stewart Kolasch & Birch, LLP

(57) ABSTRACT

Disclosed herein is a bus bar for electrically connecting electrode leads of unit modules or battery cells (unit cells) in a battery module through a coupling method employing laser welding. Each of the electrode leads and the bus bar has a plate-shaped structure and a protrusion projecting toward the electrode leads is formed on the bus bar at a portion thereof, which is to be welded to the electrode leads through laser irradiation, to allow the portion of the bus bar, which is to be welded to the electrode leads, to be brought into close contact with the electrode leads.

12 Claims, 5 Drawing Sheets

(56) References Cited

U.S. PATENT DOCUMENTS

| | | | |
|---|---|---|---|
| 2008/0199765 A1* | 8/2008 | Yoon et al. ............. 429/91 |
| 2009/0214936 A1 | 8/2009 | Yang et al. |
| 2009/0297892 A1 | 12/2009 | Ijaz et al. |
| 2009/0305116 A1* | 12/2009 | Yang et al. ............. 429/61 |
| 2010/0233521 A1* | 9/2010 | Byun et al. ............. 429/72 |
| 2010/0247999 A1* | 9/2010 | Ijaz et al. ............. 429/120 |
| 2011/0195285 A1 | 8/2011 | Shin et al. |

FOREIGN PATENT DOCUMENTS

| | | |
|---|---|---|
| EP | 1 071 147 A1 | 1/2001 |
| JP | 11-97039 A | 4/1999 |
| JP | 2001-126703 A | 5/2001 |
| JP | 2005-71677 A | 3/2005 |
| JP | 2007-250442 A | 9/2007 |
| JP | 2009-529136 A | 8/2009 |
| JP | 2009-529216 A | 8/2009 |
| JP | 2009-231145 A | 10/2009 |
| JP | 2010-510641 A | 4/2010 |
| JP | 2010-114364 A | 5/2010 |
| JP | 2010-212241 A | 9/2010 |
| KR | 10-0601525 A | 7/2006 |
| KR | 10-2007-0074511 A | 7/2007 |
| KR | 10-2007-0112489 A | 11/2007 |
| KR | 10-2010-0102542 A | 9/2010 |
| WO | WO 2006/090511 A1 | 8/2006 |
| WO | WO 2006090511 * | 8/2006 ............. H01M 2/20 |

\* cited by examiner

BUS BAR HAVING NOVEL STRUCTURE AND BATTERY MODULE INCLUDING THE SAME

CROSS REFERENCE TO RELATED APPLICATIONS

This application is a Bypass Continuation of PCT International Application No. PCT/KR2012/002714 filed on Apr. 10, 2012, which claims priority under 35 U.S.C §119(a) to Patent Application No. 10-2011-0038955 filed in the Republic of Korea on Apr. 26, 2011, all of which are hereby expressly incorporated by reference into the present application.

TECHNICAL FIELD

The present invention relates to a bus bar having a novel structure and a battery module including the same, and, more particularly, to a bus bar for electrically connecting electrode leads of unit modules or battery cells (unit cells) in a battery module through a coupling method employing laser welding, wherein each of the electrode leads and the bus bar has a plate-shaped structure and a protrusion projecting toward the electrode leads is formed on the bus bar at a portion thereof, which is to be welded to the electrode leads through laser irradiation, to allow the portion of the bus bar, which is to be welded to the electrode leads, to be brought into close contact with the electrode leads.

BACKGROUND ART

Recently, secondary batteries, which can be charged and discharged, have been widely used as energy sources for wireless mobile devices. Secondary batteries have also attracted considerable attention as power sources for electric vehicles (EV), hybrid electric vehicles (HEV) and plug-in hybrid electric vehicles (plug-in HEV), which have been developed to solve problems, such as air pollution, caused by existing gasoline and diesel vehicles that use fossil fuels.

Small-sized mobile devices use one or several battery cells for each device. On the other hand, middle or large-sized devices such as vehicles use a battery module including a number of battery cells electrically connected to each other or a battery pack including a plurality of battery modules electrically connected to each other because high power and large capacity are necessary for the middle or large-sized devices.

Since the battery module is preferably manufactured to have as small a size and weight as possible, prismatic batteries or pouch-shaped batteries, which can be stacked with high integration and have a small weight to capacity ratio, are usually used as battery cells of middle or large-sized battery modules. In particular, much interest is currently focused on pouch-shaped batteries, which use an aluminum laminate sheet as a sheathing member, due to their advantages of being lightweight and cheap to manufacture.

To use a battery module or a battery pack including a number of battery cells as a battery for vehicles such as EVs, HEVs and plug-in HEVs, it is very important to produce a battery pack including various types of unit batteries that are connected according to required battery capacity.

That is, a structure in which various types of series/parallel electrical connections are employed in the same type of battery modules may be highly competitive.

For example, methods for electrically connecting battery cells in parallel use various types of welding. Among such methods, an electrical connection method employing ultrasonic welding is widely used. However, the electrical connection method employing ultrasonic welding may have a problem of damaging the inside of battery cells and a problem associated with weld quality since ultrasonic welding directly imposes a mechanical burden upon the medium and uses friction generated by vibration.

As a non-contact welding method, laser welding is a good alternative to solve the problems. However, to apply laser welding, it is necessary to secure reliability of contact parts.

That is, use of laser welding is limited to one-to-one electrical connection since the reliability of contact surfaces is very important due to the characteristics of laser welding.

Thus, there is a great need to provide a bus bar having a specific structure, which solves the problems of laser welding and ultrasonic welding when electrically connecting batteries, and a battery module including the same.

DISCLOSURE

Technical Problem

Therefore, the present invention has been made to solve the above and other technical problems that have yet to be resolved.

Specifically, it is an object of the present invention to change the shape of a bus bar used to connect batteries to increase the reliability of laser welding while achieving process simplicity, thereby enabling reliable laser welding when electrically/mechanically connecting batteries using the bus bar.

It is another object of the present invention to provide a battery module that can be manufactured through a simple assembly method without using a number of members for mechanical coupling and electrical connection.

Technical Solution

In accordance with the present invention, the above and other objects can be accomplished by the provision of a bus bar for electrically connecting electrode leads of unit modules or battery cells (unit cells) in a battery module through a coupling method employing laser welding, wherein each of the electrode leads and the bus bar has a plate-shaped structure and a protrusion projecting toward the electrode leads is formed on the bus bar at a portion thereof, which is to be welded to the electrode leads through laser irradiation, to allow the portion of the bus bar, which is to be welded to the electrode leads, to be brought into close contact with the electrode leads.

Since the bus bar according to the present invention has a protrusion projecting toward the electrode leads at a portion thereof, which is to be welded to the electrode leads through laser irradiation, the portion of the bus bar, which is to be welded to the electrode leads, is easily brought into close contact with the electrode leads when the electrode leads of the battery cells or the unit modules ("unit cells") are electrically connected to each other through laser welding.

Specifically, to secure highly reliable contact surfaces upon laser welding, there is a need to use a support-type fixing structure. However, to apply the support-type fixing structure to the process, disadvantageously, it is necessary to complicate the structure of a laser welder or the structure of the battery module.

In this regard, since the protrusion of the bus bar allows the bus bar to closely contact the electrode leads upon laser welding, the present invention enables reliable laser welding of the bus bar and the electrode leads without complicating the structure of the laser welder or the battery module.

In addition, since the bus bar of the present invention electrically connects the electrode leads of the unit cells through laser welding, it is possible to solve the problem associated with weld quality and the problem of damaging the inside of the battery cells, as compared with the conventional method employing ultrasonic welding.

In a preferred example, the protrusion may be bent into the shape of a half polygon, a half circle or a half ellipse in vertical cross-section although the shape of the protrusion is not particularly limited so long as the shape of the protrusion allows the portion, which is to be welded to the electrode leads, to be brought into close contact with the electrode leads. Especially, it is preferable that the protrusion be bent into the shape of a half circle or a half ellipse in vertical cross-section since this achieves smooth contact between the closely contacting parts.

Since the bus bar according to the present invention is more preferable when a large number of members are welded, the unit cells are preferably electrically connected in parallel.

The projecting height of the protrusion is not particularly limited so long as the above objects are achieved. For example, the projecting height of the protrusion may be 10 to 1000% of the thickness of the bus bar. The projecting height of the protrusion is preferably 20 to 500% and more preferably 30 to 400% of the thickness of the bus bar.

The protrusion may be formed at least one portion of the bus bar which are to be welded to the electrode leads. That is, when the bus bar is laser-welded at two portions thereof to the electrode leads, protrusions may be formed respectively at the two portions. The number of protrusions may be determined according to the number of the portions for laser welding. However, at least two protrusions may also be formed at one portion for welding.

The number of the unit cells is at least two. For example, the number of the unit cells may be 2 to 10.

Laser welding is preferably performed by irradiating the electrode leads with laser light at portions thereof which are in contact with the protrusion of the bus bar after, in a state in which the electrode leads are placed on the bus bar, the electrode leads are depressed at one or both sides of the electrode leads, centered on the protrusion of the bus bar, to bring the electrode leads into close contact with the bus bar.

Since the protrusion of the bus bar of the present invention is welded to the electrode leads by the laser welder in a state in which one side or both sides of the electrode leads are depressed by the laser welder as in the above method, the present invention achieves reliable electrical connection between the electrode leads and the bus bar without changing the structure of the laser welder.

The present invention also provides a battery module that uses the bus bar to electrically connect unit cells of the battery module to each other while connecting an electrode terminal of the unit cells to an external input and output terminal.

Accordingly, it is possible to make up various types of battery modules according to the mounting location of the bus bar while maintaining the basic shape of the bus bar as described above.

In a preferred example, the battery module may include a battery cell stack including a plurality of stacked unit cells that are connected in series or in parallel, an upper case structured to cover the top of the battery cell stack and parts of the front and rear of the battery cell stack, and a lower case structured to be coupled to the upper case while covering the bottom of the battery cell stack and parts of the front and rear of the battery cell stack, the lower case including a mounting part for mounting the bus bar thereto.

In the battery module, the battery cell stack, in which the battery cells are stacked with high integration in a state in which the electrode terminals of the battery cells are connected to each other, is vertically mounted within upper and lower separable cases which are coupled to each other in an assembly-type coupling structure.

When the upper and lower cases are coupled to each other after the battery cell stack is mounted in the upper and lower cases, the upper and lower cases preferably cover only the perimeter of the battery cell stack so that outer surfaces of the battery cell stack are exposed to the outside of the upper and lower cases to easily dissipate heat from the battery cell stack. As previously described, therefore, the upper case covers the top of the battery cell stack and parts of the front and rear of the battery cell stack and the lower case covers the bottom of the battery cell stack and parts of the front and rear of the battery cell stack.

In addition, the assembly process of the battery module according to the present invention is largely simple since the bus bar is mounted to the mounting part of the lower case.

In a specific example, the bus bar may be provided at the front of the lower case.

In this structure, the bus bar may include a main body that is brought into close contact with the front of the lower case and an electrode terminal connection part that is electrically connected to an electrode terminal of the unit cells.

Preferably, one end of the main body includes the input and output terminal connection part that is connected to the external input and output terminal and the other end thereof includes a mounting protrusion that is mounted to the lower case.

The input and output terminal connection part may have an inwardly recessed region that is defined at an upper portion thereof such that the external input and output terminal is downwardly fitted in the recessed region.

The electrode terminal connection part may be upwardly bent perpendicular to the main body.

For example, each of the battery cells may be a plate-shaped battery cell having electrode terminals formed respectively at upper and lower ends of the battery cell.

The battery cell stack preferably includes a plurality of unit modules including plate-shaped battery cells, each battery cell including electrode terminals formed respectively at upper and lower ends of the battery cell. Each of the unit modules may include at least two battery cells having electrode terminals connected in series and/or in parallel, and a pair of high-strength cell covers which are coupled to each other so as to cover the entire outside of the battery cell stack excluding the electrode terminals of the battery cells.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, embodiments of the present invention will be described in detail with reference to the accompanying drawings. However, it should be noted that the description of the embodiments is given to provide better understanding of the present invention without limiting the scope of the invention.

Figure 1:
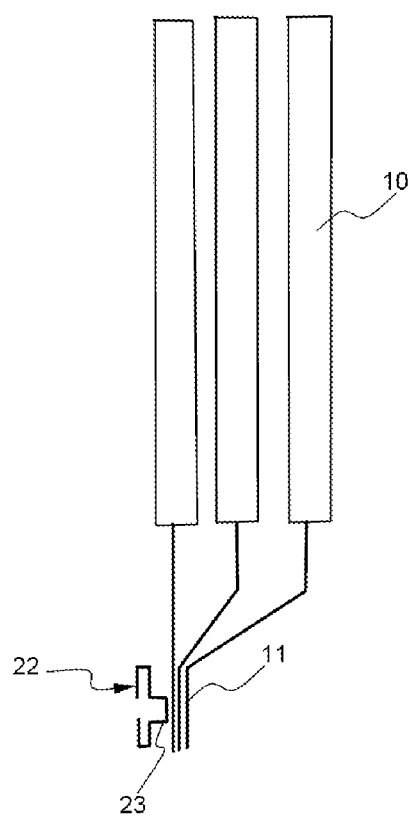
FIG. 1 is a schematic plan view of a bus bar according to an embodiment of the present invention.
Figure 2:
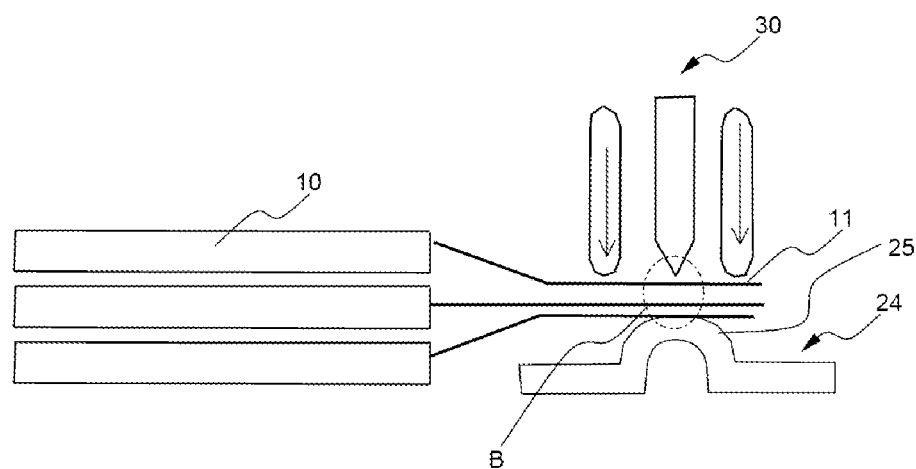
FIG. 2 is a schematic view of a laser welding process according to an embodiment of the present invention.

FIG. 1 is a schematic plan view of a bus bar according to an embodiment of the present invention and FIG. 2 is a schematic view of a laser welding process according to an embodiment of the present invention.

First, FIG. 1 shows a bus bar 22 for electrically connecting electrode leads 11 of three unit cells 10 through a coupling method employing laser welding.

Each of the electrode leads 11 and the bus bar 22 has a plate-shaped structure and a protrusion 23 projecting toward the electrode leads 11 is formed on the bus bar 22 at a portion thereof which is to be welded to the electrode leads 11 through laser irradiation. This allows the portion of the bus bar 22, which is to be welded to the electrode leads 11, to be brought into close contact with the electrode leads 11.

While the protrusion 23 of the bus bar 22 of FIG. 1 is bent upward into a rectangular shape in vertical cross-section, a protrusion 25 of a bus bar 24 of FIG. 2 is bent upward into a half circle shape in vertical cross-section.

Referring to FIG. 2, in a state in which the electrode leads 11 are placed on the bus bar 24, electrode leads 11 are depressed (as shown by arrows) at both sides of the electrode leads, centered on the protrusion 25 of the bus bar 24, to bring the electrode leads 11 into close contact with the bus bar 24. The electrode leads 11 are then irradiated with laser light at portions B thereof, which are in contact with the protrusion 24 of the bus bar 24, to laser-weld the portions B, thereby connecting the three unit cells 10 in parallel.

Figure 3:
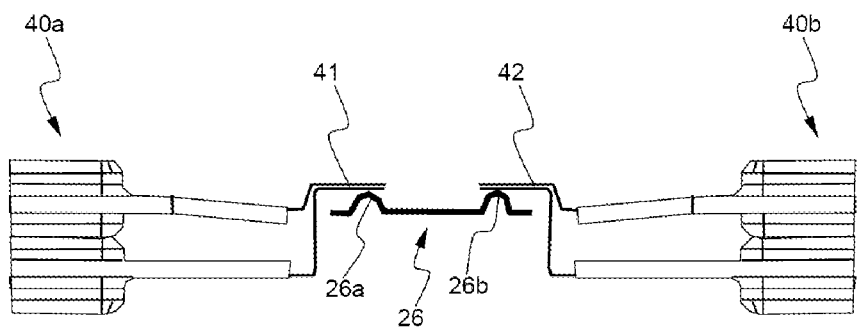
FIG. 3 is a schematic vertical cross-sectional view of a bus bar according to another embodiment of the present invention.

FIG. 3 is a schematic vertical cross-sectional view of a bus bar according to another embodiment of the present invention.

As shown in FIG. 3, a bus bar 26 has protrusions 26a and 26b at both sides thereof. Electrode leads 41 of two unit cells 40a located to the left and the left protrusion 26a of the bus bar 26 are laser-welded to each other and the two unit cells 40a located to the left are then electrically connected in parallel.

In addition, electrode leads 42 of two unit cells 40b located to the right and the right protrusion 26b of the bus bar 26 are laser-welded to each other and the two unit cells 40b located to the right are then electrically connected in parallel.

As a result, the unit cells 40a located to the left and the unit cells 40b located to the right are connected in series through the bus bar 26, thus achieving a 2-parallel, 2-series (2P-2S) connection structure.

Figure 4:
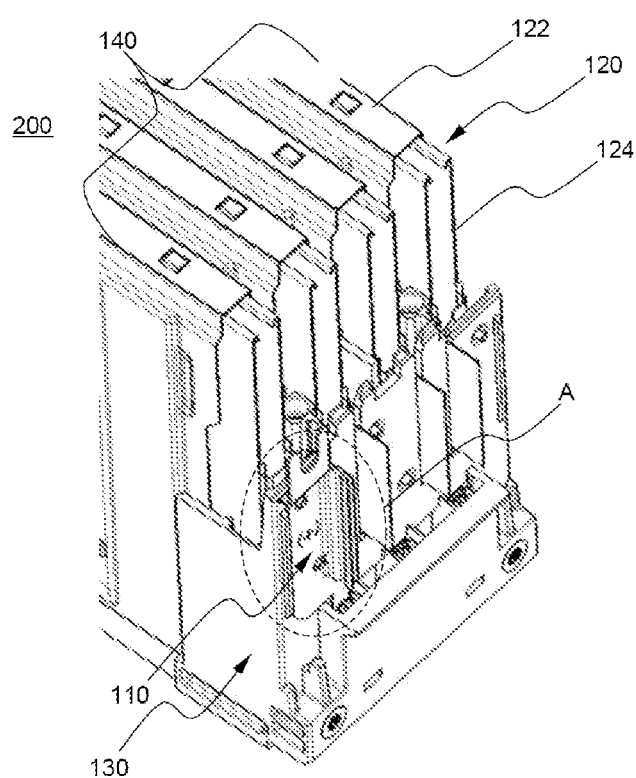
FIG. 4 is a partial perspective view of a battery module according to another embodiment of the present invention.
Figure 5:
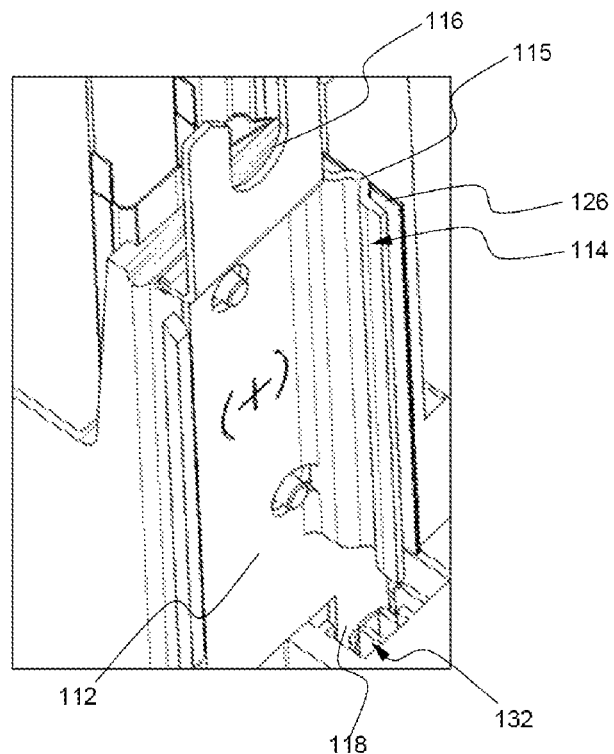
FIG. 5 is a magnified perspective view of a part A of FIG. 4.

FIG. 4 is a schematic partial perspective view of a battery module according to another embodiment of the present invention and FIG. 5 is a schematic magnified perspective view of a part A of FIG. 4.

As shown in FIGS. 4 and 5, a bus bar 110 of a battery module 200 serves both to electrically connect unit modules 120 of the battery module 200 to each other and to connect an electrode terminal of the unit modules 120 to an external input and output terminal (not shown).

The battery module 200 includes a battery cell stack 140, an upper case (not shown), and a lower case 130.

The battery cell stack 140 includes four parallel-connected unit modules 120 which are stacked in a lateral direction. The upper case (not shown) is structured to cover the top of the battery cell stack 140 and parts of the front and rear of the battery cell stack 140.

The lower case 130 is structured to be coupled to the upper case while covering the bottom of the battery cell stack 140 and parts of the front and rear of the battery cell stack 140. The lower case 130 also includes a mounting part 130 for mounting the bus bar 110 thereto.

The bus bar 110 is provided at the front of the lower case 130 and includes a main body 112 that is brought into close contact with the front of the lower case 130 and an electrode terminal connection part 114 that is electrically connected to an electrode terminal 126 of the unit modules 120.

The main body 112 has, at one end thereof, an input and output terminal connection part 116 that is connected to an external input and output terminal and has, at the other end thereof, a mounting protrusion 118 that is mounted to the mounting part 132 of the lower case 130.

The input and output terminal connection part 116 has an inwardly recessed region that is defined at an upper portion of the main body 112 such that the external input and output terminal is downwardly fitted in the recessed region. The electrode terminal connection part 114 is upwardly bent perpendicular to the main body 112.

The electrode terminal connection part 114 has, at a center portion thereof, a protrusion 115 that projects toward the electrode terminal 126 and that is bent upward into a half ellipse shape.

Each of the unit modules 120 includes two battery cells 124 having electrode terminals connected in parallel and a pair of high-strength cell covers 122 which are coupled to each other so as to cover the entire outside of the battery cells 124 excluding the electrode terminals of the battery cells 124.

Figure 6:
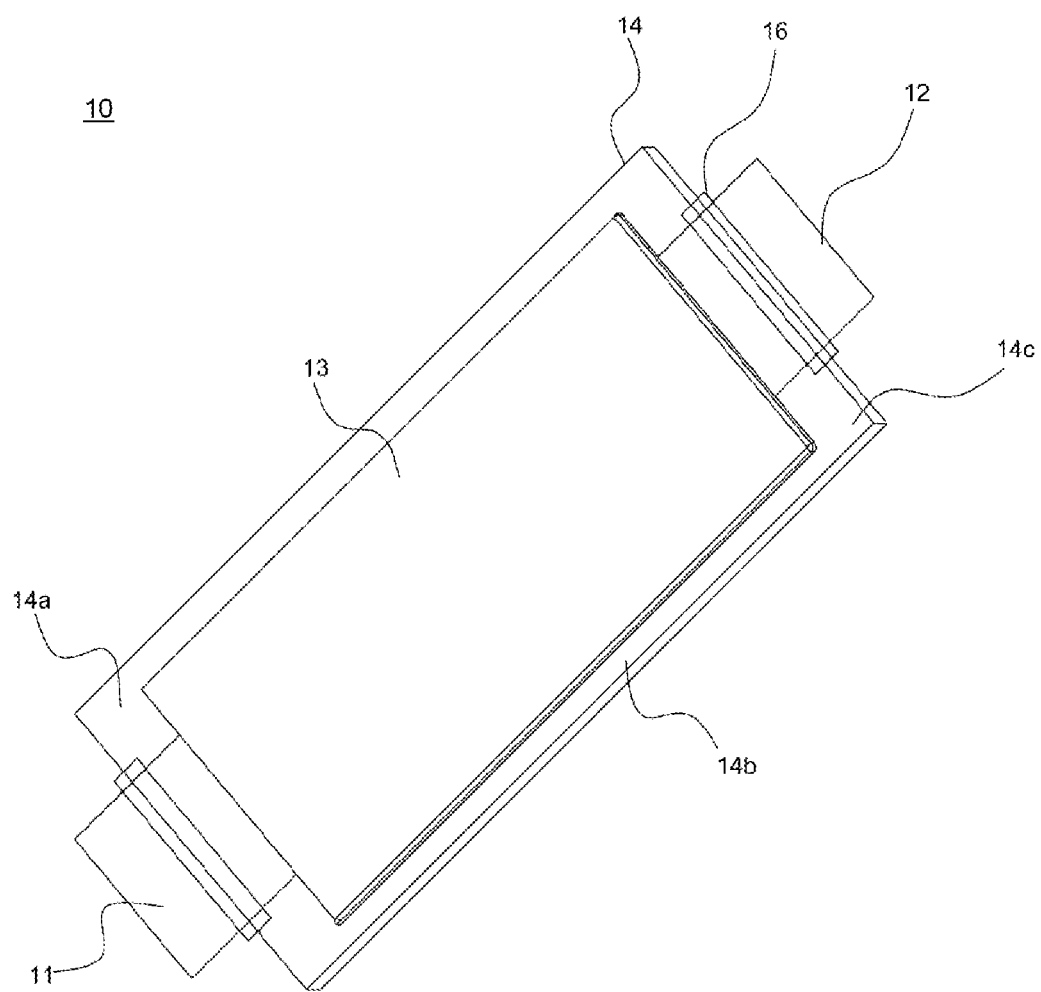
FIG. 6 is a view of an exemplary plate-shaped battery cell.

FIG. 6 is a schematic view of an exemplary plate-shaped battery cell.

As shown in FIG. 6, a plate-shaped battery cell 10 is structured such that two electrode leads 11 and 12 protrude respectively from the upper and lower ends of a battery body 13 so that the electrode leads 11 and 12 are opposite to each other. A sheathing member 14 includes upper and lower sheathing parts. That is, the sheathing member 14 is a two-unit member. In a state in which an electrode assembly (not shown) is mounted within a receiving part defined between the upper and lower sheathing parts of the sheathing member 14, opposite sides 14b, upper ends 14a and lower ends 14c of the upper and lower sheathing parts of the sheathing member 14, which are contact regions of the upper and lower sheathing parts, are bonded to each other to form the battery cell 10. The sheathing member 14 has a laminate structure of a resin layer, a metal foil layer, and a resin layer. Thus, it is possible to bond the opposite sides 14b and the upper and lower ends 14a and 14c of the upper and lower sheathing parts of the sheathing member 14, which are in contact with each other, to each other by applying heat and pressure to the opposite sides 14b and the upper and lower ends 14a and 14c to weld the resin layers thereof to each other. Where appropriate, the opposite sides 14b and the upper and lower ends 14a and 14c of the upper and lower sheathing parts of the sheathing member 14 may be bonded to each other using a bonding agent. The same resin layers of the upper and lower sheathing parts of the sheathing member 14 are in direct contact with each other at the opposite sides 14b. Therefore, the upper and lower sheathing parts of the sheathing member 14 can be uniformly sealed at the opposite sides 14b by welding. On the other hand, the electrode leads 11 and 12 protrude from the upper and lower ends 14a and 14c of the sheathing member 14, respectively. Therefore, the upper and lower ends 14a and 14c of the upper and lower sheathing parts of the sheathing member 14 are thermally welded to each other in a state in which a film type sealing member 16 is interposed between the electrode leads 11 and 12 and the sheathing member 14 to improve sealability in consideration of the thickness of the electrode leads 11 and 12 and the material difference between the electrode leads 11 and 12 and the sheathing member 14.

Although the present invention has been described above with reference to the drawings which illustrate the embodiments of the present invention, it will be apparent to those skilled in the art that various modifications and variations are possible in light of the above teaching without departing from the scope of the invention.

INDUSTRIAL APPLICABILITY

As is apparent from the above description, a bus bar according to the present invention increases the reliability of laser welding while achieving process simplicity, thereby enabling reliable laser welding when electrically/mechanically connecting batteries using the bus bar, since the bus bar according to the present invention has a protrusion as described above.

In addition, each battery module according to the present invention can be manufactured through a simple assembly method without using a number of members for mechanical coupling and electrical connection since the battery module includes a bus bar structured as described above.

The invention claimed is:

1. A battery module comprising at least two unit modules or at least two unit cells and at least one bus bar for electrically connecting the at least two unit modules or at least two unit cells through a coupling method employing laser welding, wherein:
   each unit module or unit cell comprises electrode leads having plate-shaped structure,
   the at least one bus bar has a plate-shaped structure having a longer dimension and a shorter dimension with two elongated protrusions projecting perpendicularly from the plate-shaped bus bar structure and extending in the direction of longer dimension, and
   each protrusion projecting towards and contacting a flat portion of a plate-shaped electrode lead, thereby forming a contact surface between the protrusion and the electrode lead,
   wherein at least one welded joint is formed at the contact surface by irradiating the electrode leads with laser light, thereby welding the protrusion to the flat portion of the plate-shaped electrode lead.

2. The battery module according to claim 1, wherein the protrusions are bent into a half circle shape or a half ellipse shape in vertical cross-section.

3. The battery module according to claim 1, wherein the unit cells are electrically connected in parallel.

4. The battery module of claim 1, wherein the at least on bus bar electrically connects the unit cells of the battery module to each other while connecting an electrode terminal of the unit cells to an external input and output terminal.

5. The battery module according to claim 4, wherein the battery module further comprises:
   a battery cell stack comprising a plurality of stacked unit cells that are connected (i) in series, (ii) in parallel, or (iii) in series and in parallel;
   an upper case structured to cover the top of the battery cell stack and parts of the front and rear of the battery cell stack; and
   a lower case structured to be coupled to the upper case while covering the bottom of the battery cell stack and parts of the front and rear of the battery cell stack, the lower case comprising a mounting part for mounting the bus bar thereto.

6. The battery module according to claim 5, wherein the bus bar is provided at the front of the lower case.

7. The battery module according to claim 6, wherein the bus bar comprises a main body that is brought into close contact with the front of the lower case and an electrode terminal connection part that is electrically connected to at least one electrode terminal of the unit cells.

8. The battery module according to claim 7, wherein one end of the main body comprises an input and output terminal connection part that is connected to the external input and output terminal and the other end thereof comprises a mounting protrusion that is mounted to the lower case.

9. The battery module according to claim 8, wherein the input and output terminal connection part has an inwardly recessed region that is defined at an upper portion thereof such that the external input and output terminal is downwardly fitted in the recessed region.

10. The battery module according to claim 7, wherein the electrode terminal connection part is upwardly bent perpendicular to the main body.

11. The battery module according to claim 1, wherein each of the unit cells is a plate-shaped battery cell having electrode terminals formed respectively at upper and lower ends of the battery cell.

12. The battery module according to claim 4, wherein each of the unit modules comprises:
   at least two unit cells having electrode terminals connected (i) in series, (ii) in parallel, or (iii) in series and in parallel; and
   a pair of high-strength cell covers which are coupled to each other so as to cover the entire outside of the unit cells excluding the electrode terminals of the unit cells.

* * * * *